US007017702B2

(12) United States Patent
Gunby

(10) Patent No.: US 7,017,702 B2
(45) Date of Patent: Mar. 28, 2006

(54) TRANSPORT ENGINE AND DRIVE ARRANGEMENT

(76) Inventor: William Gunby, P.O. Box 2598, Palm City, FL (US) 34991-2598

( * ) Notice: Subject to any disclaimer, the term of this patent is extended or adjusted under 35 U.S.C. 154(b) by 0 days.

(21) Appl. No.: 10/605,624

(22) Filed: Oct. 14, 2003

(65) Prior Publication Data

US 2004/0104065 A1 Jun. 3, 2004

Related U.S. Application Data

(60) Provisional application No. 60/417,627, filed on Oct. 11, 2002.

(51) Int. Cl.
*B60K 1/00* (2006.01)

(52) U.S. Cl. ...................... 180/291; 180/248; 180/249; 475/206

(58) Field of Classification Search ................ 180/248, 180/249, 245, 240, 291, 292, 293, 297, 53.6, 180/53.61, 53.62, 53.7, 53.8, 374, 378, 380; 475/86, 118, 138, 202, 206
See application file for complete search history.

(56) References Cited

U.S. PATENT DOCUMENTS

| | | | | |
|---|---|---|---|---|
| 3,771,617 | A * | 11/1973 | Hornung | 180/24.02 |
| 4,027,737 | A * | 6/1977 | Garry | 180/298 |
| 4,217,970 | A * | 8/1980 | Chika | 180/298 |
| 4,267,895 | A * | 5/1981 | Eggert, Jr. | 180/68.1 |
| 4,535,964 | A * | 8/1985 | Schutz et al. | 180/299 |
| 5,088,346 | A * | 2/1992 | Hirabayashi et al. | 74/606 R |
| 5,098,351 | A * | 3/1992 | Kobayashi | 475/86 |
| 5,209,321 | A * | 5/1993 | Sado | 180/248 |
| 5,335,764 | A * | 8/1994 | Leitner et al. | 475/118 |
| 5,467,668 | A * | 11/1995 | Kameda et al. | 180/297 |
| 5,908,366 | A * | 6/1999 | Weismann et al. | 180/248 |
| 5,941,136 | A * | 8/1999 | Kusukawa et al. | 180/53.6 |
| 6,142,905 | A * | 11/2000 | Brown et al. | 180/248 |
| 6,305,488 | B1 * | 10/2001 | Montineri | 180/374 |
| 6,821,166 | B1 * | 11/2004 | Roycroft et al. | 440/12.51 |

* cited by examiner

*Primary Examiner*—Hau Phan
(74) *Attorney, Agent, or Firm*—Connolly Bove Lodge & Hutz LLP; Larry J. Hume

(57) ABSTRACT

A parallel engine and transmission drive arrangement with application to both land and marine vehicles reduces the large moment arm and moment about the rear axle in the case of land vehicles, and provides trim and stability and compact arrangement of the drive arrangement in the case of a marine vessel. The arrangement is applicable to buses, tractor-trailer rigs, towing, dump trucks, garbage trucks, concrete trucks, fire trucks, recreational vehicles, and boats or ships. In one aspect, the engine and transmission are laterally arranged in a parallel manner. This arrangement shortens the longitudinal distance necessary in rear-mounted engine designs from about 120 inches to as little as 54 inches. The large moment arm found about the rear axle in conventional rear-mounted engines is thereby reduced, and the transfer case performance requirements are relaxed, resulting in a transfer case with reduced bulk and weight.

8 Claims, 4 Drawing Sheets

TRANSPORT ENGINE AND DRIVE ARRANGEMENT

CROSS REFERENCE TO RELATED APPLICATIONS

This application claims the benefit under 35 U.S.C. §119 (e) of Provisional patent application Ser. No. 60/417,627, filed on Oct. 11, 2002, by William Gunby entitled "Transport Engine and Drive Arrangement", the entire contents of which is incorporated herein by reference.

BACKGROUND

This application generally to an arrangement for a power drive train, and more specifically to an arrangement and connection of an engine to a transmission, and even more particularly to an arrangement of a rear or mid-mounted engine, transfer case, and transmission having application in a land transport vehicle, and to an arrangement and connection of an engine and transmission to a propulsion shaft in a marine vehicle such as a boat.

Conventionally, heavy-duty transporter vehicles such as used in buses, tractor-trailer rigs, towing, dump trucks, garbage trucks, concrete mixing trucks, fire trucks, and recreational vehicles, for example, require large, heavy propulsion equipment. Such equipment includes, for example, gasoline or diesel engines and transmissions, and other drive train components such as transfer cases and differentials connecting to driven axles and wheels.

Further, boat and ship propulsion equipment can also be large and heavy, and can have an adverse impact on the trim and stability of the vessel, depending on the location of the propulsion equipment, e.g., diesel engine, reduction gear, and propulsion shaft and thrust bearings, with respect to the center of gravity and center of buoyancy of the vessel.

In the case of a tractor used for hauling a trailer, a front-mounted diesel engine is generally used, with the driver's cab situated above the engine. This arrangement results in several undesirable characteristics, including the cab being located high above the ground and almost directly over the engine, causing difficulty in entry, and the presence of high noise and vibration levels which can lead to driver fatigue and discomfort. A rear or mid-engine mounted engine arrangement could overcome or reduce the problems associated with the high cab, and could also reduce the noise and vibrations experienced by persons riding in the cab.

In many rear-mounted engine applications, conventional wisdom in the automotive propulsion field dictates that a minimum distance of approximately 120 inches or 3 meters is needed from the driven rear axle to the back of the engine. This distance is required to provide for essentially straight line interconnection of the drive components, i.e., a rearward facing engine, transmission, and drive shaft to a rear differential connected to the rear driven axle. This places a large weight located along a relatively long moment arm behind the rear driven axle, which essentially acts as a fulcrum. This resulting relatively large moment tends to make the front end of the vehicle rotationally rise up about the rear axle when a bump in the road is encountered, for example. To counter the tendency for the front end to lift, an optional undriven, so-called "tag axle" is often placed behind the driven axle to counter the action of the large moment, and thus prevent the front end from lifting off the road. The use of tag axles is common in buses, and dump trucks, for example.

In the case of buses used for intra-city transport, the engine is often transversely mounted in the rear of the vehicle, using a so-called "V-drive" arrangement. This arrangement can reduce the moment arm discussed above, however, due to practical considerations, this type of transverse engine drive arrangement is generally limited to engines having a horsepower rating of 250 HP or less, and may not provide the needed power for heavy-duty applications.

What is needed then is a drive arrangement for a transport vehicle which overcomes the above-noted problems, while providing the ability to use a relatively high powered and heavier engine and transmission. What is further needed is an engine drive arrangement which allows a reduction in the cab height of a transport vehicle such as a tractor, and which also reduces the undesirable noise and vibration imparted to the cab. What is still further needed is an engine drive arrangement which places a rear-mounted engine and transmission near the driven axle to reduce the moment arm and moment, and which reduces the tendency for the front end of the transport vehicle to rise from the roadway. What is even still further needed is an engine drive arrangement which places a rear-mounted engine and transmission near the driven axle in such a manner that, in certain applications, the need for a tag axle may be eliminated.

BRIEF SUMMARY

This disclosure invention is directed to an engine and transmission or reduction gear drive arrangement for a transport vehicle which at least partially solves the problems of conventional arrangements, for both land vehicles, and marine vehicles, as discussed above. The arrangement has wide applicability to, for example, buses, tractor-trailer rigs, towing, dump trucks, garbage trucks, concrete trucks, fire trucks, recreational vehicles, and boats or ships. In one aspect of the invention, the engine and transmission are laterally arranged with respect to each other in essentially a parallel manner, thus significantly shortening the longitudinal straight-line distance necessary to arrange the drive train in rear-mounted engine designs from about 120 inches to as little as 54 inches. In particular, the large moment arm found about the rear axle in conventional rear-mounted engines is significantly reduced, and the transfer case performance requirements are significantly relaxed, resulting in a less bulky and lower weight transfer case.

In one embodiment, a propulsion drive arrangement for a vehicle includes an engine; a transfer case having an input shaft coupled to an output shaft of the engine at one end of the engine; a transmission having an input shaft coupled to an output shaft of the transfer case; a drive shaft coupled to an output shaft of the transmission; and coupled to the drive shaft, means for propelling the vehicle, wherein the engine is located at a position which is laterally offset from and adjacent to a side of the transmission so as to be essentially parallel with the transmission along respective longitudinal axes thereof, and wherein the input shaft and output shaft of the transfer case are both located on a same side of the transfer case corresponding to the one end of the engine.

In other aspects of this embodiment, the means for propelling the vehicle includes a set of wheels attached to an axle coupled to the transmission drive shaft through a differential. In another aspect of this embodiment, the means for propelling the vehicle includes one or more propellers coupled to the transmission drive shaft through one or more associated propeller shafts. Instead of propellers, other types of boat propusion systems could be used, e.g., jet propulsors which pump water in a jet stream to provide motion through the water.

In another aspect of this embodiment, both the engine and transmission are arranged behind the axle and differential, i.e., at the rear of the vehicle in a rear-engine configuration. In this aspect, a moment arm of the engine and transmission arrangement may be less than a distance between the differential and the transfer case. An alternative aspect of this embodiment, both the engine and transmission may be arranged in front of the driven axle and differential, i.e., in a mid-engine configuration.

In another embodiment, a method of providing propulsion for a vehicle includes arranging an engine and a transmission to be side-by-side in a mid-engine or rear-engine configuration so that respective output shafts are essentially parallel and displaced from each other; providing a torque output on an engine output shaft; reversing a direction of the torque output from the engine output shaft; coupling the reversed torque output to a transmission input; and applying an output of the transmission to one or more drive elements of the vehicle.

In other aspects of this embodiment, the applying step may include applying the transmission output to a set of wheels of a land vehicle, or to a propeller, water jets, or surface drive propulsion of a marine vehicle, such as a boat.

In other aspects of this embodiment, the method includes ensuring that a moment arm of the engine and transmission arrangement is within a respective length of both the engine and the transmission.

In the marine vehicle aspects of the invention, a propulsion engine and transmission or reduction gear gearsets are laterally arranged with respect to each other in essentially a parallel manner, thus significantly shortening the longitudinal straight-line distance necessary to arrange the propulsion shaft for a marine vehicle. In particular, the drive arrangement may be placed so as to optimize or enhance the sea-keeping ability of the marine vessel, and the transfer case performance requirements may also be significantly relaxed, resulting in a less bulky and lower weight transfer case or main reduction gear, and in a more compact design, which may be desired in relatively small boats, for example.

These and other features of the disclosure will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION

Figure 1:
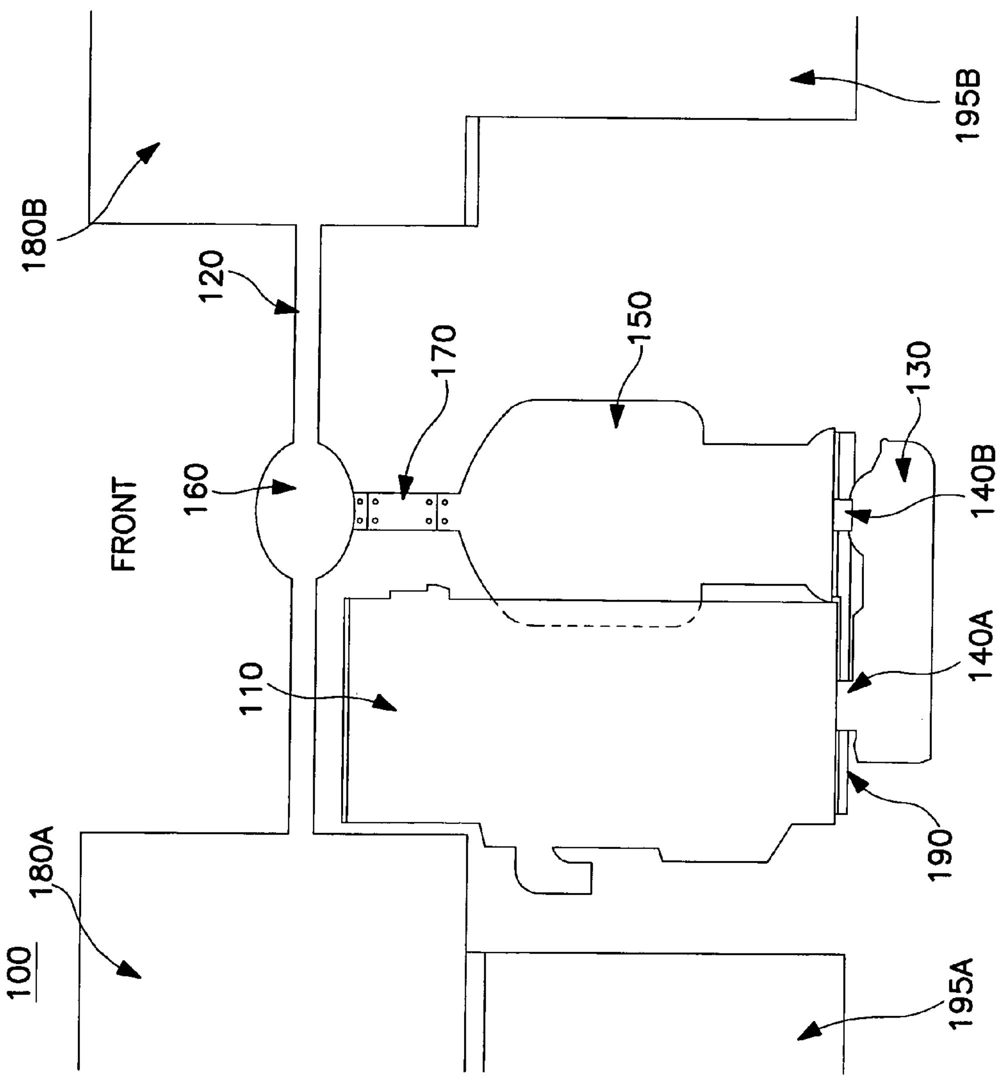
FIG. 1 is a plan view of one embodiment of the invention.

Turning to FIG. 1, one embodiment of the invention is shown, wherein a transport vehicle propulsion drive arrangement 100 has a rear-mounted engine 110, which preferable faces forward, and which may also be mounted in a longitudinally offset position with respect to a centerline of a transport vehicle (not shown). Engine 110 may utilize gasoline, diesel, or alternative fuel sources, e.g., natural gas. In one aspect of this embodiment, a Cummins Diesel model ISM (625 HP), or model ISX (available in 280–500 HP range) may be used.

The front of engine 110 is preferably located relatively close to the driven rear axle 120, e.g., within only a few inches, although other configurations may also be implemented. The rear end of engine 110, from which an engine drive shaft (not shown) protrudes, is coupled to an input shaft of transfer case 130, either directly, or through universal join (U-joint) 140A. Through transfer case 130, the power train from the engine drive shaft is reversed or "folded" 180 degrees by an output shaft of transfer case 130 which is preferably located on the same side of transfer case 130 as is the input shaft of transfer case 130. Because transfer case 130 is directly coupled to engine 110, a 1:1 transfer ratio may preferably be used to reduce the size of the transfer case and the mechanical stresses that must be dealt with within transfer case 130. In one aspect of this embodiment, transfer case 130 may be a Marmon-Herrington model MVG-2000 transfer case, for example.

In the situation where the engine 110 is coupled to transfer case 130 through U-joint 140A, engine 110 may be inclined from the horizontal with the front end higher than the rear end of the engine, thus providing an angle between the engine drive shaft and the input shaft of transfer case 130. Such inclination of engine 110 relative to transfer case 130 may provide additional ground clearance in some applications, e.g., for the oil pan of engine 110, and may also act to further reduce the moment arm about rear axle 120 by reducing the distance of the center of gravity of the drive train, i.e., engine, transfer case, and transmission, from the driven axle.

An input shaft of transmission 150 is coupled to the output shaft of transfer case 130, either directly, or through universal join (U-joint) 140B. U-joint 140B may be used in a situation where the transmission input shaft is not horizontally aligned with the output shaft of transfer case 130. Preferably, the input shaft of transmission 150, located in the front of transmission 150, is arranged to face rearward, so that engine 110 and transmission 150 are facing in opposite directions, i.e., "anti-parallel". In one aspect of this embodiment, transmission 150 may be an Allison HD-4060 model transmission, but could be, in other aspects, any one of a manual, automatic, or viscose (fluid) drive transmission, depending on the needs of the particular application, or other cost or operational considerations.

Figure 2:
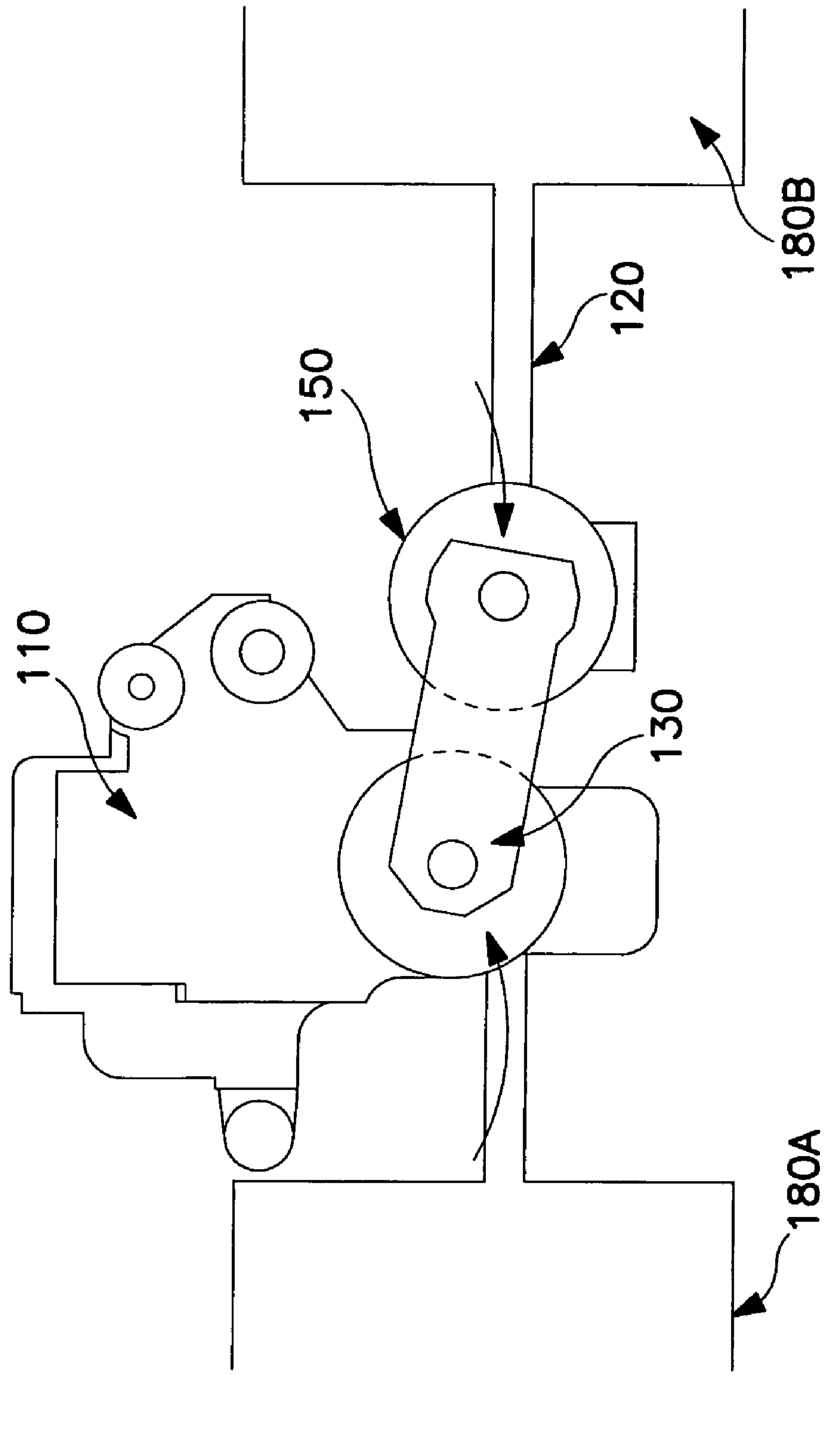
FIG. 2 is a rear elevation view of the embodiment of FIG. 1, looking forward to the front end of the transport vehicle.
Figure 3:
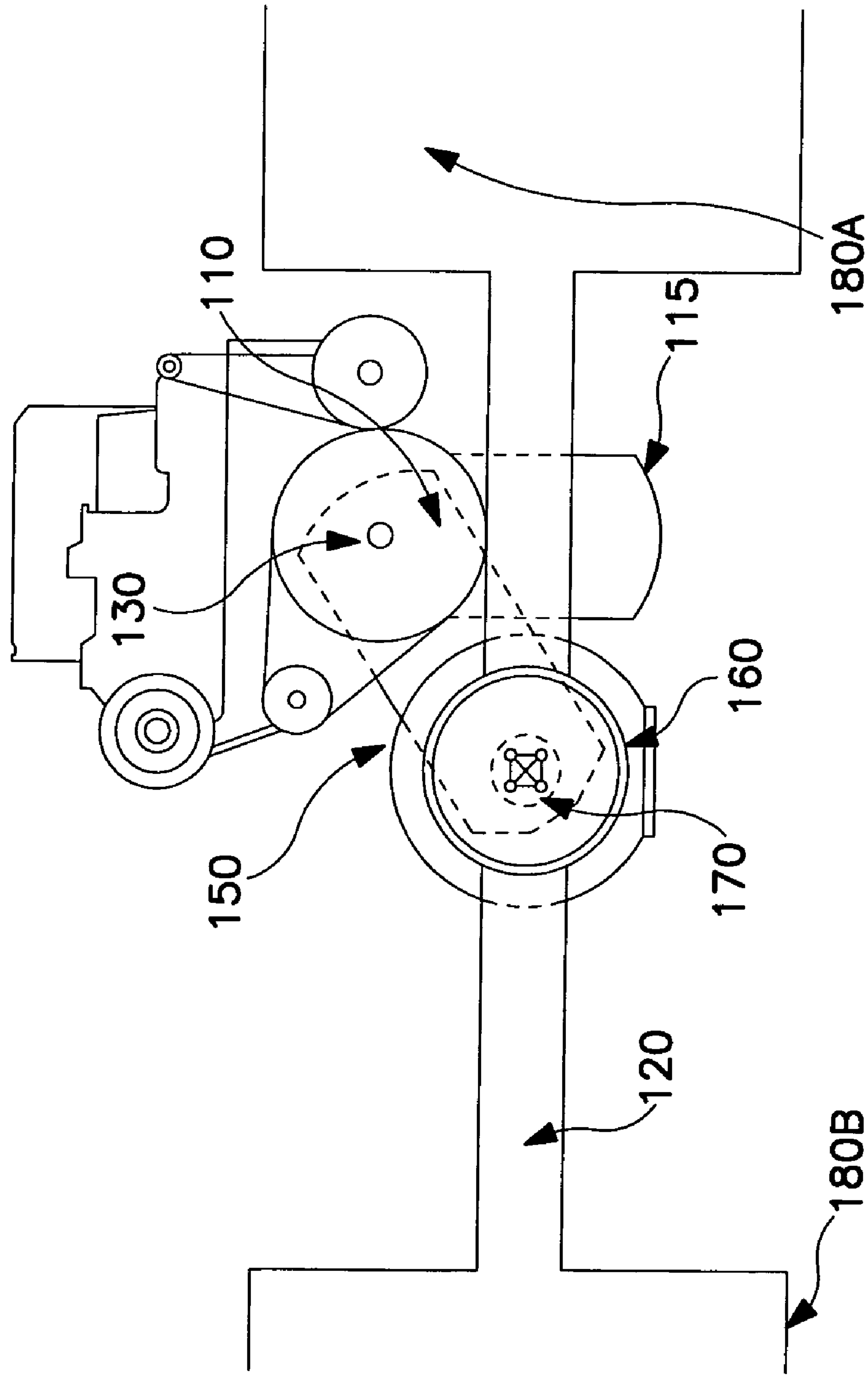
FIG. 3 is a front elevation view of the embodiment of FIG. 1, looking rearward to the rear end of the transport vehicle.
Figure 4:
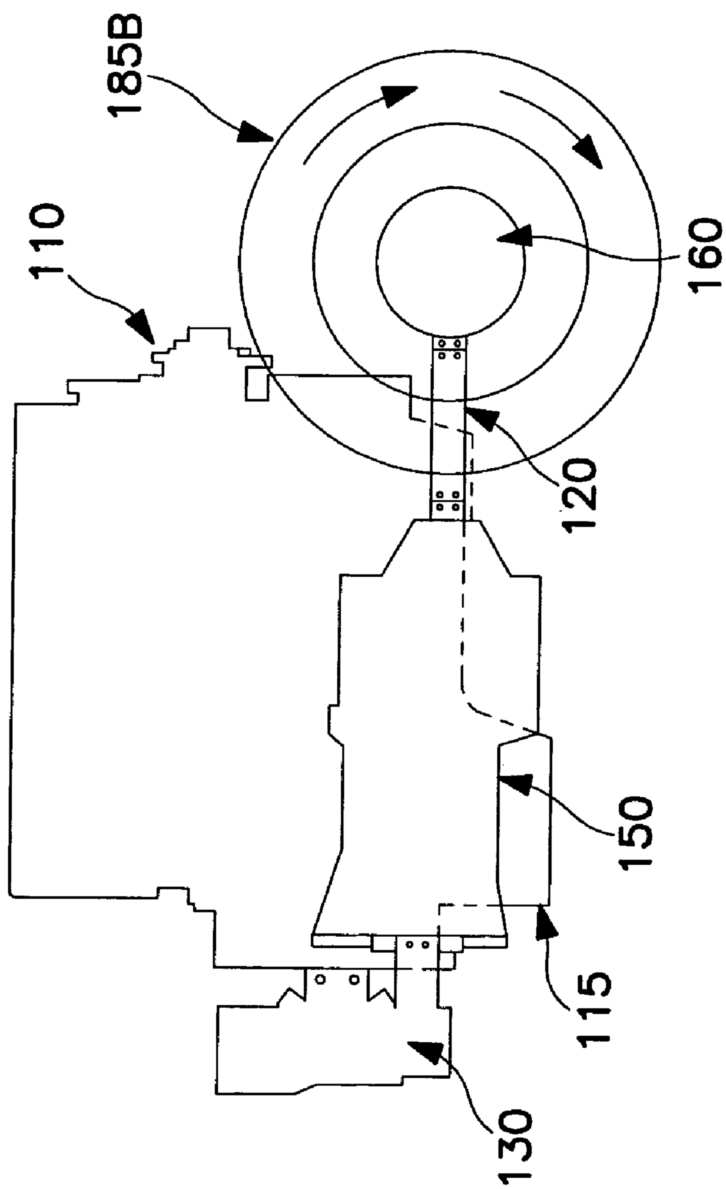
FIG. 4 is a side elevation view of the embodiment of FIG. 1, looking across the transport vehicle from the right side of the transport vehicle.

The output shaft of transmission 150 is coupled to differential 160 through driveshaft 170, or may be more directly coupled to differential 160 using double, i.e., back-to-back, universal joints (not shown). Differential 160 preferably drives rear axle 120 and wheels 185A and 185B located within wheel wells 180A and 180B in a conventional manner, as depicted in FIG. 4. FIGS. 2–4 provide alternative views of the engine drive arrangement.

The relative parallel and side-by-side arrangement of engine 110 and transmission 150 allows the "straight line" requirement for engine/transmission/drive shaft connection to differential 160 to be reduced from the conventional 120 inches to as little as 54 inches, which is approximately 24 inches shorter than a conventional transverse or lateral engine arrangement using a right-angle transmission used in city buses, for example.

Mounting plate 190 may be bolted to the rear of engine 110, and also may serve as a rear engine mount. Further, transfer case 130 may also be connected to mounting plate, e.g., by use of bolts. Still further, mounting plate 190 may also be connected to transmission 150, and may function as a transmission mount, by use of bolts, for example. Thus, mounting plate 190 and other mounting supports (not shown) may be used to allow engine 110, transfer case 130, and transmission 150 to be interconnected as one unit to reduce problems associated with torsional forces acting on all three units.

In some applications, use of optional tag axles 195A and 195B may be desired, if the weight of the propulsion drive train used is such that there is still some tendency for the transport vehicle's front end to rise, even though the arrangement described above significantly reduces the moment arm and moment about the rear axle found in conventional rear-mounted engine applications.

Advantages of the parallel engine/transmission arrangement are apparent to those with skill in the art and include, among other features, a dramatic reduction in the overhanging rear weight, i.e., reduced moment arm and moment; a shortening of the distance from the driven axle to the rear of the transport vehicle by up to 7 feet or just over approximately 2 meters or less; a reduction of the resulting stress placed on frame and suspension members; a substantial lowering of the center of gravity of the propulsion drive system, i.e., engine and transmission, primarily; a substantial reduction of the torque multiplication which is conventionally required through the transmission to the transfer case, thus eliminating the need for bulky, heavy transfer cases, because the transfer case in one embodiment is connected between the engine and transmission.

For example, torque from an engine is multiplied as it passes through a transmission, so that a conventional transfer case may have to handle torques of up to 20,000 ft-lbs (27,000 N-m). In contrast, using an embodiment of the invention described above, the transfer case only has to handle the direct torque of the engine, which is normally in the 1,000–2,000 ft-lbs range, and not the multiplied torque of the transmission.

One additional advantage of the arrangement described above for either land vehicles or marine vessels, is that offsetting the engine to either side in front or in back of the driven axle or reduction gear has certain advantages over engines placed along the center line of the differential or propulsion shaft, such as creating additional space or a center passageway in transport vehicles used for certain applications.

In marine vessel applications such as a boat or ship, for example, transmission 150 may be adapted to have the proper gear sets and gear ratios necessary for producing the desired output RPM at driveshaft 170, or may be a marine reduction gear. In this case, the desired output shaft RPM would be appropriate for the torque and speed requirements of a marine vessel propulsion shaft. A thrust bearing of known type (not shown) may also be inserted in the propulsion drive train to account for the reaction force of a propeller rotating through the water to drive the marine vessel through the water. Transmission 150 may be replaced, in one aspect of the invention, by a marine reduction gear or other suitable gearing, to match the output shaft speed of engine 110 with the operating shaft propulsion speed.

Further, in another aspect of the marine vessel embodiment, engine 110 and transmission 150 may be optimized for efficient power transfer in a particular RPM range of output driveshaft 170. In this situation, a known controllable pitch propeller, or controllable reversible pitch propeller may be used in the propulsion drive train to control the shaft torque and, ultimately, the speed of the marine vessel through the water.

The foregoing description of the invention illustrates and describes certain aspects of the invention. Additionally, the disclosure shows and describes only the preferred embodiments of the invention, but as aforementioned, it is to be understood that the invention is capable of use in various other combinations, modifications, and environments, and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

The invention claimed is:

1. A non-transverse propulsion drive arrangement for a vehicle, the non-transverse arrangement comprising:
- an engine;
- a transfer case having an input shaft coupled to an output shaft of the engine at one end of the engine, wherein the transfer case only has a single output shaft;
- a transmission having an input shaft coupled to the single output shaft of the transfer case;
- a drive shaft coupled to a single output shaft of the transmission; and
- a differential coupled to the single output shaft of the transmission,
- wherein the engine is located at a position which is laterally offset from and adjacent to a side of the transmission so as to be essentially parallel with the transmission along respective longitudinal axes thereof,
- wherein the input shaft and output shaft of the transfer case are both located on a same side of the transfer case corresponding to the one end of the engine,
- wherein each of the respective longitudinal axes of the engine and transmission are aligned with a longitudinal axis of the vehicle in a non-transverse manner, and
- wherein both the engine and transmission are arranged behind the axle and differential in a rear-mounted engine configuration.

2. The propulsion drive arrangement of claim 1, further comprising a set of wheels attached to an axle coupled to the single transmission drive shaft through the differential.

3. The propulsion drive arrangement of claim 2, wherein a moment arm of the engine and transmission arrangement is less than a distance between the differential and the transfer case.

4. The propulsion drive arrangement of claim 1, wherein a front end of the engine is higher than a rear end of the engine so as to provide an angle between the engine output shaft and an input shalt of the transfer case.

5. A non-transverse propulsion drive arrangement for a vehicle, the non-transverse arrangement comprising:
- an engine;
- a transfer case having an input shaft coupled to an output shaft of the engine at one end of the engine, wherein the transfer case only has a single output shaft;
- a transmission having an input shaft coupled to the single output shaft of the transfer case;
- a single drive shaft coupled to the single output shaft of the transmission; and a set of wheels attached to an axle coupled to the single drive shaft through a differential, wherein the engine is located at a position which is laterally offset from and adjacent to a side of the transmission so as to be essentially parallel with the transmission along respective longitudinal axes thereof, and wherein the input shaft and the single output shaft of the transfer case are both located on a same side of the transfer case corresponding to the one end of the engine, wherein each of the respective longitudinal axes of the engine and transmission are aligned with a longitudinal axis of the vehicle in a non-transverse manner, and wherein both the engine and transmission are arranged in front of the axle and differential in a mid-mounted engine configuration.

6. A method of providing propulsion for a vehicle, the method comprising:

arranging an engine and a transmission to be side-by-side in a non-transverse manner with respect to a longitudinal axis of the vehicle so that respective output shafts are essentially parallel and displaced from each other and aligned along the longitudinal axis of the vehicle;

providing a torque output on an engine output shaft;

reversing a direction of the torque output from the engine output shaft;

coupling the reversed torque output to a transmission input;

applying a single transmission output to a differential having a single input; and applying two differential outputs to two associated drive elements, wherein both the engine and transmission are arranged behind the one or more drive elements of the vehicle in a rear-mounted engine configuration.

7. The method of claim 6, wherein the applying two differential outputs to two associated drive elements comprises applying the two differential outputs to a set of wheels.

8. The method of claim 6, further comprising ensuring that a moment arm of the engine and transmission arrangement is within a respective length of both the engine and the transmission.

* * * * *